(12) United States Patent
West (10) Patent No.: US 6,210,041 B1
(45) Date of Patent: Apr. 3, 2001

(54) BEARING AND APPARATUS AND METHOD FOR FABRICATING SAME

(76) Inventor: William A. West, 1699 Devonshire Ct., Westlake Village, CA (US) 91301

(*) Notice: Subject to any disclaimer, the term of this patent is extended or adjusted under 35 U.S.C. 154(b) by 628 days.

(21) Appl. No.: 08/512,656

(22) Filed: Aug. 8, 1995

(51) Int. Cl.[7] .................................................. F16C 33/74
(52) U.S. Cl. ............................................ 384/147; 384/130
(58) Field of Search .................................. 384/130, 139, 384/140, 147, 276, 280, 322, 372–381

(56) References Cited

U.S. PATENT DOCUMENTS

| 2,349,898 | * | 5/1944 | Bechman | 384/381 |
| 2,622,449 | * | 12/1952 | Barker | 384/130 X |
| 3,458,214 | | 7/1969 | West | 280/104.5 |
| 4,575,914 | * | 3/1986 | Armida et al. | 384/381 X |
| 4,979,722 | * | 12/1990 | Totten | 384/147 X |
| 5,141,339 | * | 8/1992 | Evans | 384/147 X |

FOREIGN PATENT DOCUMENTS

| 943869 | * | 6/1956 | (DE) | 384/280 |
| 829799 | * | 7/1938 | (FR) | 384/377 |

* cited by examiner

*Primary Examiner*—Thomas R. Hannon
(74) *Attorney, Agent, or Firm*—Evanns & Walsh; Joseph R. Evanns (57) ABSTRACT

An improved bearing usable, among other applications, in a suspension system for heavy vehicles and in other machines includes an internal member, a journal fitted to the internal member and an external member fitted to the journal member, at least one end of the external member extending beyond at least one and of the journal member and defining a recess for receiving a seal member, to seal against either the bushing, shaft or journal member, for preventing intake of extraneous matter such as dirt and for preventing leakage of lubricant from the bearing. A method of fabrication of bearings Alternatively, the journal and internal member may comprise a single part includes the steps of machining or pressfitting an inner member with a journal section in turn fitted or slipped into an external member. Apparatus for fabricating a bearing component comprises a slide tool with at least two adjustable receiving mounts for receiving a cutting tool and a pressblock.

5 Claims, 8 Drawing Sheets

BEARING AND APPARATUS AND METHOD FOR FABRICATING SAME

BACKGROUND OF THE INVENTION

1. Field of the Invention

The invention relates to the general field of bearings, linear and rotary, and in particular such bearings for use as bushings for tandem axle vehicle suspension systems among other machines.

2. Description of the Prior Art

The bearing of the invention being particularly useful in connection with center bushings in tandem axle vehicle suspension systems, the bearing of the invention will be discussed primarily in connection with such use. The bearing of the invention is an improvement upon the structure disclosed in U.S. Pat. No. 3,458,214 granted Jul. 29, 1969 to the inventor herein, said '214 patent being incorporated by reference herein. The context of the present invention is described in detail in the '214 patent and thus will be discussed briefly herein.

Tandem axle suspension systems for rear vehicle wheels are widely used in connection with large load-bearing capacity vehicles such as tractor and trailers, trucks, and the like. Tandem axle suspension systems include as a key element thereof bearing assemblies mounted in equalizer beams which are part of the tandem axle suspension systems in connection with axles of the vehicles. The beams are mounted pivotally by their ends to the axles and by their mid-points to brackets attached to the vehicle chassis. The bearings of the invention and of the '214 patent are useable in connection with such bearing assemblies on equalizer beams including beam center bushings and beam end bushings.

The structure in the '214 patent successfully addressed a number of the needs and deficiencies of prior bearing assemblies including the deficiencies inherent in rubber center bushings, awkward and inconvenient replacement of such bushings, deterioration of rubber bushings and inadequate lubrication of non-elastomer bushings. In addition, the '214 patent successfully addressed the then existing need for more conveniently installed bearings.

The progress of commerce and in particular the demands of ever-greater efficiency and safety in all sectors of the economy including transportation, have rendered it desirable to improve the structure and installation of, as well as tools used in connection with fabricating bearing assemblies, particularly in heavy weight-bearing capacity vehicles such as trucks. Materials, such as aluminum, of parts used in conjunction with bushings, may be attacked and weakened by harsh chemicals, causing breakage and resulting potential for serious accidents. In addition, a common problem arises when existing seals rub on the shaft or internal bearing member, causing grooves to be worn creating a stress riser tending to cause the shaft to break, with resulting potential for accidents. There has been a felt but unfulfilled need for efficiently-sealed and readily installable and conveniently lubricated bushings.

Under existing methods, machining of parts for bushings is performed to a given diameter, and bushings with thin walls may be difficult to bore accurately due to their flexible nature and their frequently non-uniform wall thickness and out-of-round condition. Therefore, there has been a felt but unfullfilled need for methods and apparatus for machining tubing to specific wall thicknesses and to selected size of internal bore.

SUMMARY OF THE INVENTION

An improved bearing comprises an internal bearing member, a journal member affixed to the internal member, and an external bearing member disposed on the journal member, a recess being defined thereby for receiving a seal member for sealing the bushing.

In an alternative embodiment, the external bearing member defines a groove for seating thereinto of a seal member, the seal member being seatable against the journal member and the external member and vice versa.

In another alternative embodiment, the internal member and journal member comprise a single integral member with an intermediate portion and an internal portion the external portion and the external member forming a recess for receiving a seal member. In another alternative embodiment, the external member and the external portion of the single member defining mating grooves to receive a seal member.

Apparatus for use in connection with producing bushings in accordance with the invention comprises a slide tool with at least a pair of mounts for receiving a cutting tool and a pressure member, in a preferred embodiment the mounts being separately adjustable to vary the distance therebetween to control thickness of walls and size of bore of a tube being bored for parts for the invention. In another embodiment, the respective mounts are adjustable in one dimension retaining the distance between the receiving mounts with a separate adjustment. A method for fabricating bearings in accordance with the invention comprises the steps of providing an internal member, disposing an external member over the internal member and defining a recess, disposing at least one seal member within the recess to seal with the internal member. A method for fabricating a component of a bushing in accordance with the invention comprises the steps of concurrently placing a cutter member and a retaining member in a slide tool for providing substantial uniform wall thickness.

DETAILED DESCRIPTION OF A PREFERRED FORM OF THE INVENTION AND PREFERRED METHOD OF PRACTICE

Depicted in FIGS. 1–7C, inclusive, are bushings usable in connection with machinery such as all automotive equipment including a tandem axle suspension system 10 of a type frequently used in connection with heavy equipment such as large machines, trucks and trailers, cargo vehicles, as well as earth-moving equipment. The '214 patent having described in detail such a tandem axle suspension system, the description herein will be brief incorporating the '214 patent by reference herein.

Figure 1:
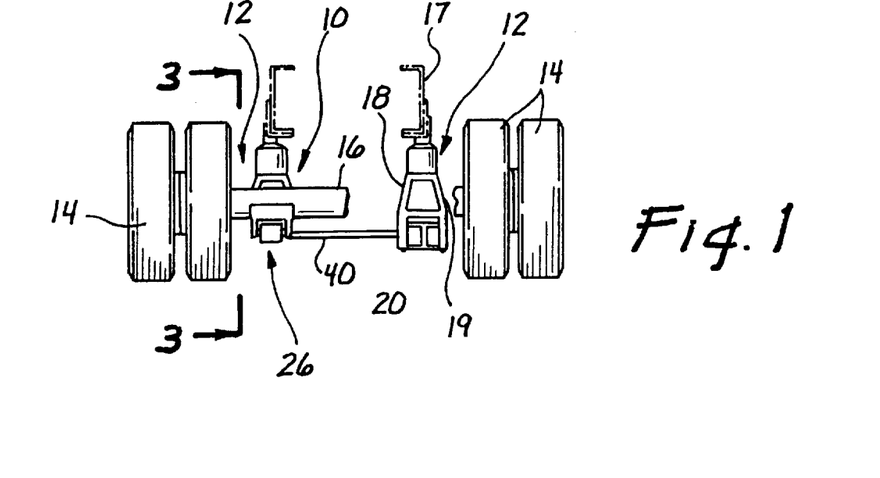
FIG. 1 is an elevational view, partly broken away, of a tandem axle vehicle suspension system incorporating an improved bearing in accordance with the invention.
Figure 2:
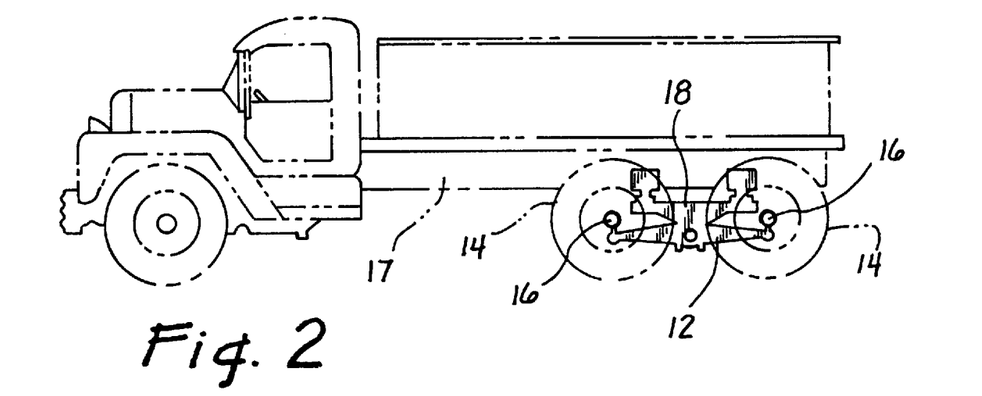
FIG. 2 is a side elevation, reduced in scale, of a vehicle with the tandem suspension system of FIG. 1.
Figure 3:
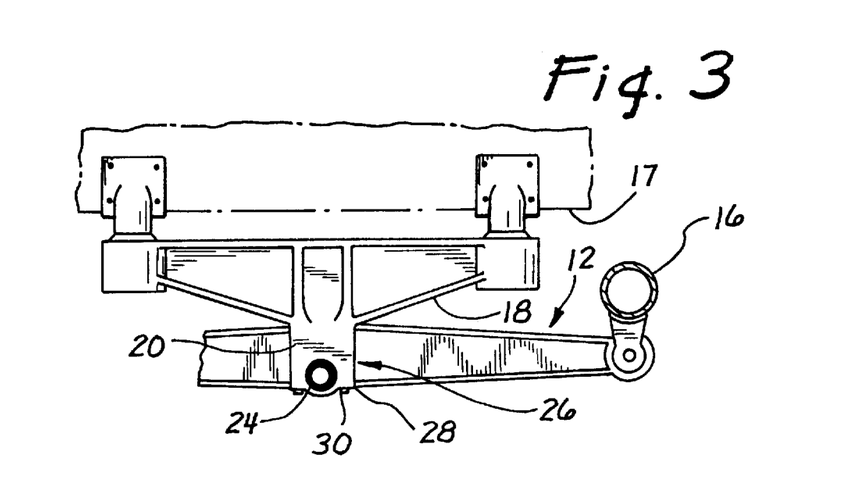
FIG. 3 is an enlarged sectional view taken along the line 3—3 in FIG. 1.
Figure 4:
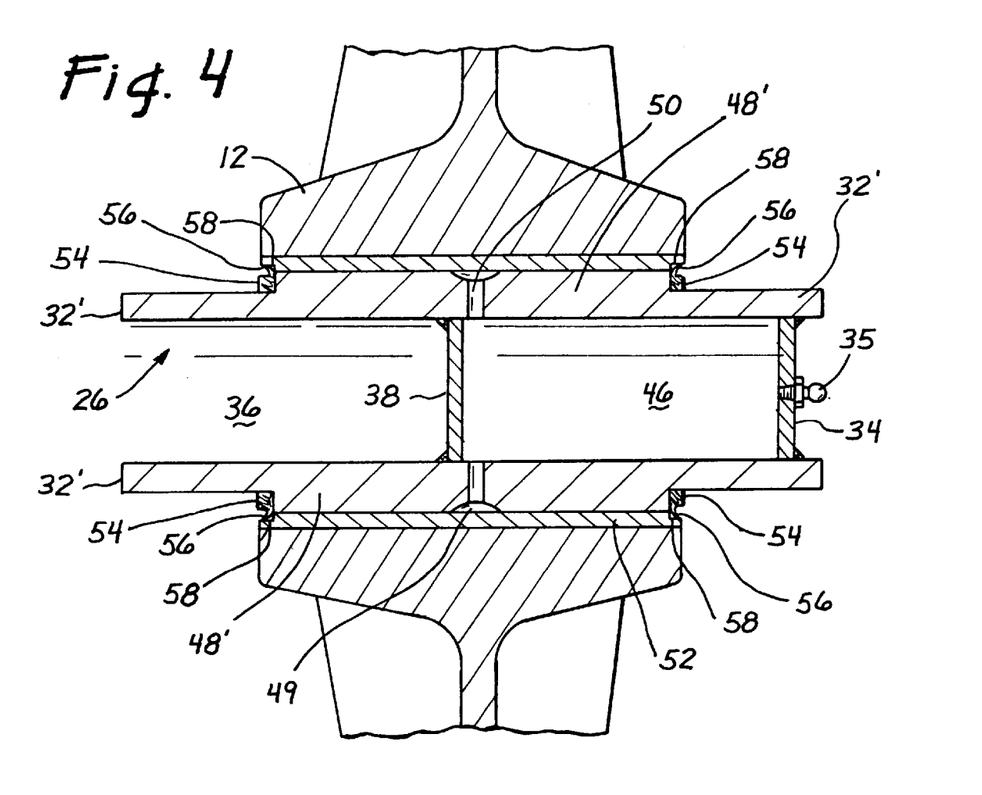
FIG. 4 is a sectional view through an equalizing beam of a tandem axle vehicle suspension system incorporating an alternative embodiment of a bearing in accordance with the invention.
Figure 4A:
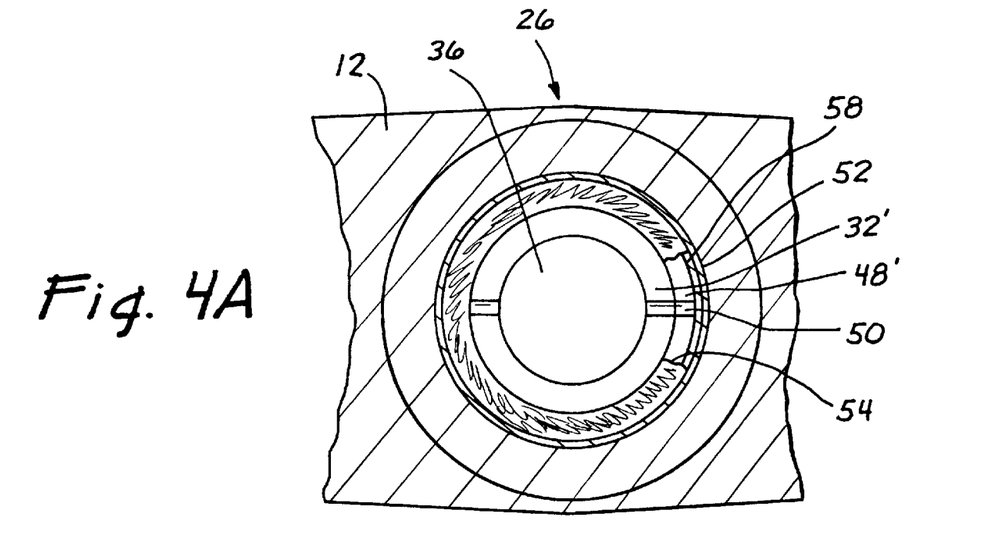
FIG. 4A is an end view of the bearing of FIG. 4.

Suspension system 10 comprises a pair of equalizer beams 12 extending along the vehicle between sets of rear wheels 14, which are in turn mounted on an axle 16 extending across vehicle chassis 17.

Each beam 12 is centrally pivotally mounted on a bracket or saddle 18 having a downwardly depending yoke 19 with arms 20 straddling a central portion of the respective beams 12.

Downwardly opening grooves or recesses are defined in the lower ends of arms 20 of yoke 19 on brackets 18 and contain internal bearings in the form of bushings or bearings 26 in accordance with the invention. As employed herein, the term "internal" shall mean toward the core or center of a shaft or tube, whereas "external" shall mean the opposite direction to the internal direction, that is, away from the center of a shaft or tube. Bearings 26 pivotally mount each beam 12 on brackets 18. Bearings 26 are attached to arms 20 by caps 28 attached to arms 20 by bolts 30.

As will be apparent herein, bearing 26 is a unitary assembly with its components fitted together so that it may be efficiently installed and removed.

Figure 6:
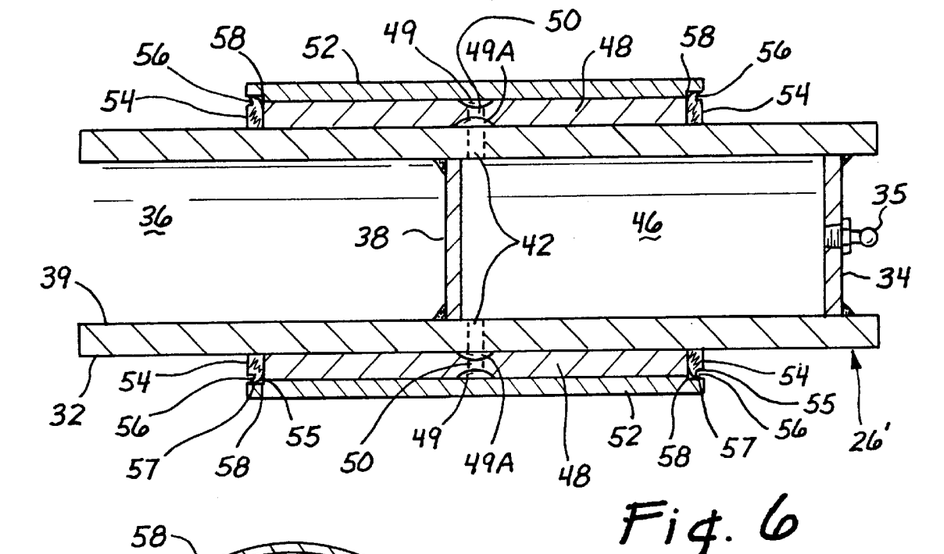
FIG. 6 is a sectional view of a preferred embodiment of a bearing in accordance with the invention.
Figure 6A:
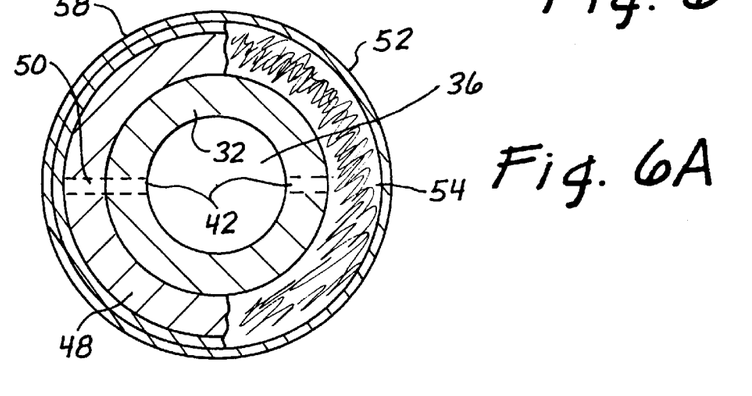
FIG. 6A is an end view of the bearing of FIG. 6.

As seen in FIGS. 6,6A, in a preferred embodiment bearing 26 comprises an internal bearing member or tube 32 having an outer end wall 34 in which is mounted a lubrication fitting 35 and defining a central bore 36. An intermediate wall 38 is disposed within bore 36 sealed to an inner wall 39 thereof. In the depicted embodiment, in which the invention is employed with a truck having a cross-tube element in its suspension, bore 36 is configured to receive through its inner end a cross tube 40 extending transversely of the underside of vehicle chassis 17 between brackets 18. The invention may be employed without any necessity for a cross-tube, and may be employed in applications other than those relating to truck suspensions or to suspensions at all, and is depicted in the present context for specificity only.

Bearing 26 further includes a sleeve or journal member 48 pressfitted or machined onto tube 32 to be affixed thereto. Journal member 48 is preferably composed of steel material with a smooth surface and is generally cylindrical in form, defining an external peripheral recess 49 and an internal recess 49A. Within recesses 49, 49A are defined ports 50. As described in detail in the '214 patent, the combination of recesses 49, 49A and ports 50 comprises a portion of the lubrication system for the bearing 26, the ports 50 being aligned with port 42 and communicating with chamber 46.

An external bearing member in the form of a sleeve 52 surrounds member 48. A resilient seal 54 with a seal body 55 and lip 56 is fitted at the end of journal 48 between internal member tube 32 and external member 52.

Tube 32 and seal 54 are fitted to one another.

Seal 54 is disposed within shoulders 57 forming a recess 58 defined at the ends of external bearing member 52 whose ends extend beyond the ends of the journal member 48 such that the seal 54 in recess 58 seats and seals against exterior bearing 52.

Thus, bearing 26 is a unitary assembly fitted together; as such, bearing 26 is conveniently installed as a unit. Installation is accomplished by pressing the assembly into the equalizing beams and seating extending ends of inner member 32 in arms 20 of brackets 18 and secured thereto by caps 28.

Chamber 46 is filled with lubricant under pressure or by gravity through fitting 35. The lubricant circulates through the lubrication system described. Seals 54 prevent outward flow of lubricant and inward passage of impurities such as road debris and the like.

Figures 5, 5A, 5B, 5C:
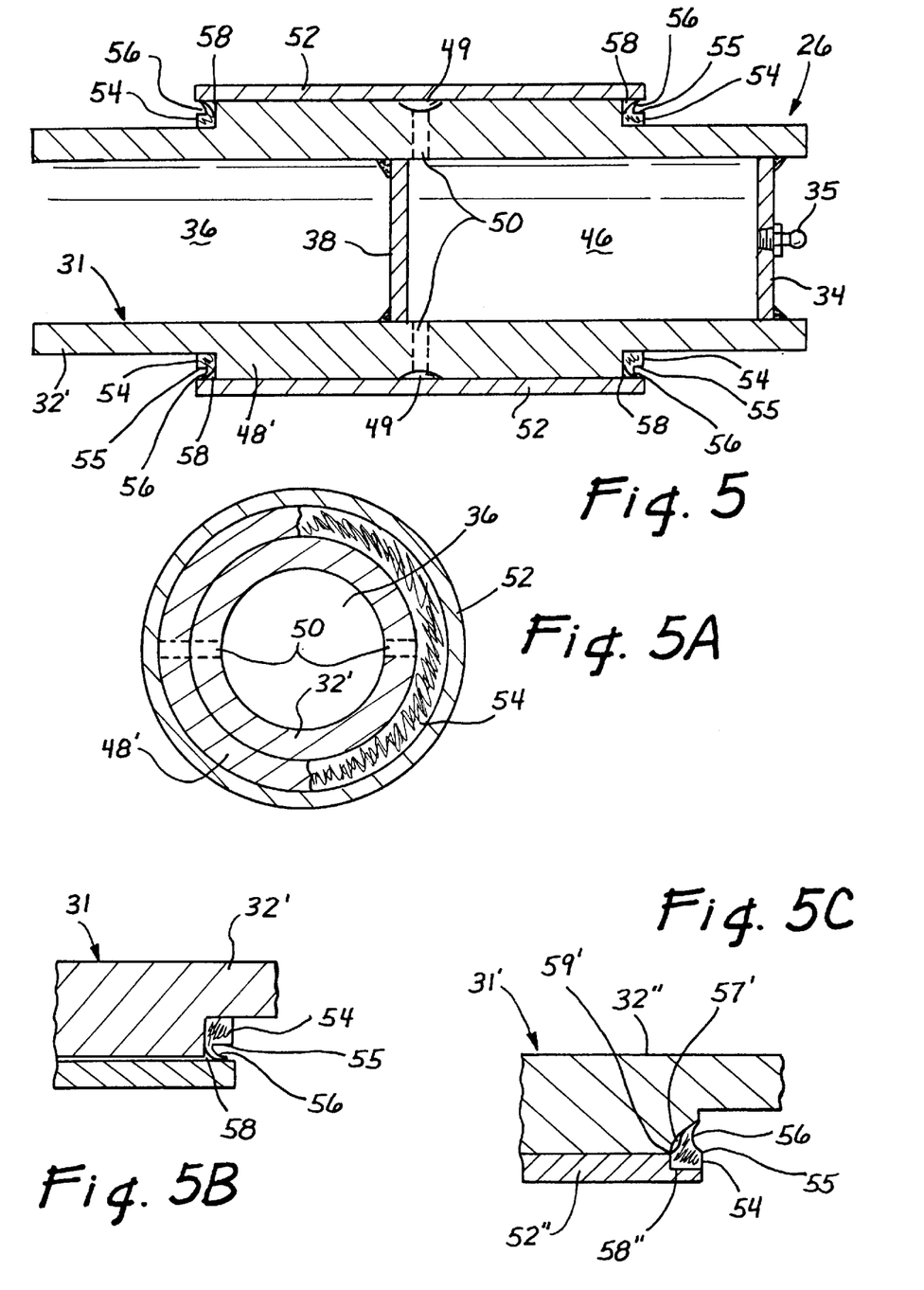
FIG. 5 is an enlarged view of an alternative embodiment of a bearing in accordance with the invention.
FIG. 5A is an end view of the bearing of FIG. 5.
FIG. 5B is an enlarged, fragmentary view of a portion of the bearing of FIG. 5, including a seal.
FIG. 5C is an enlarged fragmentary view depicting an alternative sealing arrangement.
Figure 6B:
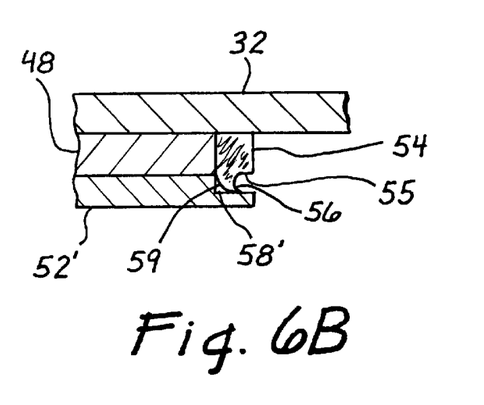
FIG. 6B is an enlarged, fragmentary view of a portion of the bearing of FIG. 6 including a seal.
Figure 6C:
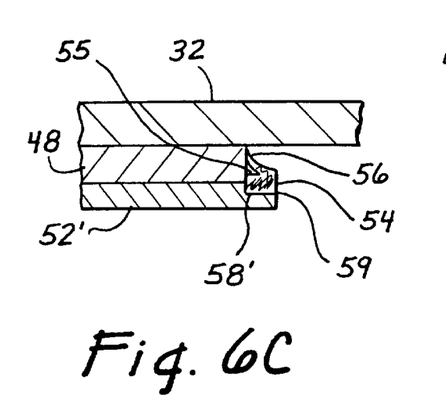
FIG. 6C is an enlarged view depicting an alternative sealing arrangement.

As shown in FIG. 6C, in an alternative arrangement for disposition of seal member 54, seal lip 56 seals against the member 48 or, reversed, said body 55 seats inside member 52', the latter being the same as part 52 except that it defines a groove 59 forming a recess 58' (analogous to recess 58). The orientation of seal 54 as depicted in FIG. 6B substantially comprises a rotation of the seal from its position as shown in FIG. 6C and provides substantially equal performance, the orientation of the seal member depicted in FIG. 6B being comparable to the orientations of comparable seal members in FIG. 5B and FIG. 7B.

Additional alternative embodiments of the invention are depicted in FIGS. 5, 5A–5C. The embodiment of FIG. 5 is depicted also in FIG. 4 as part of vehicle suspension system 10. In the embodiment of FIGS. 5, 5A, 5B, parts 32, 48 depicted in FIG. 6, comprise a single member 31 having an internal portion 32' and an external portion 48'. Seal 54 is depicted as seating against member 31 with seal body 55 and with lip 56 contacting external member 52. As depicted in FIG. 5C, an alternative sealing arrangement includes an external member 52" defining a groove 59'. A part 31' analogous to part 31 includes an internal portion 32" and an external portion 48". Member 32" defines a slot 57', in which seal 54 is positionable in sealing engagement, slot 57' mating with groove 59' to form a recess 58".

Figure 7:
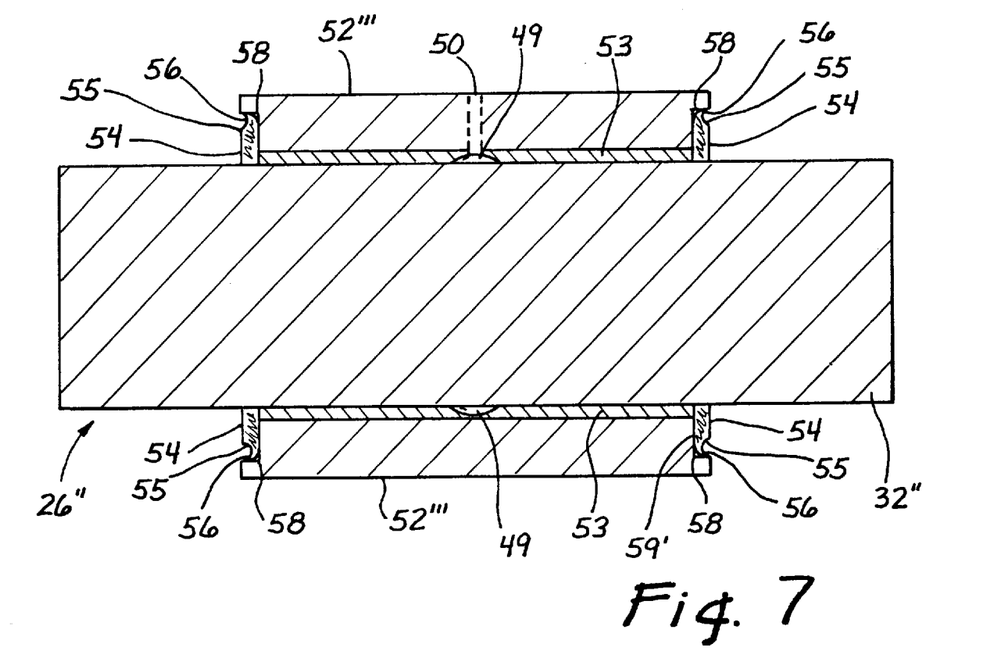
FIG. 7 is a view of an alternative embodiment of a bearing in accordance with the invention.
Figure 7A:
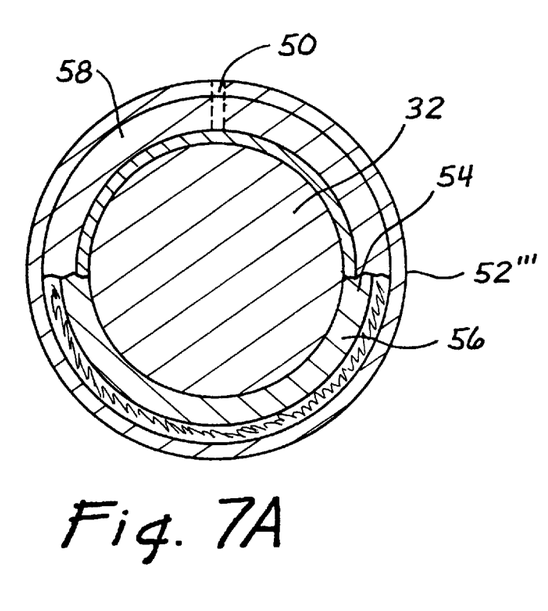
FIG. 7A is an end view of the bearing of FIG. 7.
Figure 7B:
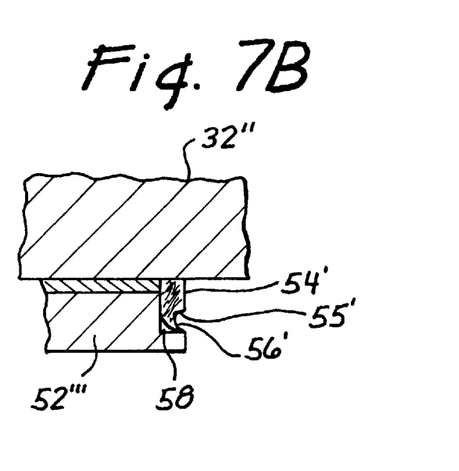
FIG. 7B is an enlarged, fragmentary view of a portion of the bearing of FIG. 7 including a seal.

FIG. 7 depicts an alternative embodiment of the invention. In the embodiment of FIG. 7, a bearing 26" comprises a solid internal member 32" an overlying external bearing member 52''' with an inner section 53 of low friction material. Defined in member 52''' is a relief 59". A seal 54' with body 55' and lip 56', is positionable in sealing engagement in a recess 58''' formed in external member 52''' whereby lip 56 contacts the inside surface of recess 58" and the seal body 54 seats against member 32". In other applications, part 53 and external bearing member 52''' form an integral single part.

Figure 8:
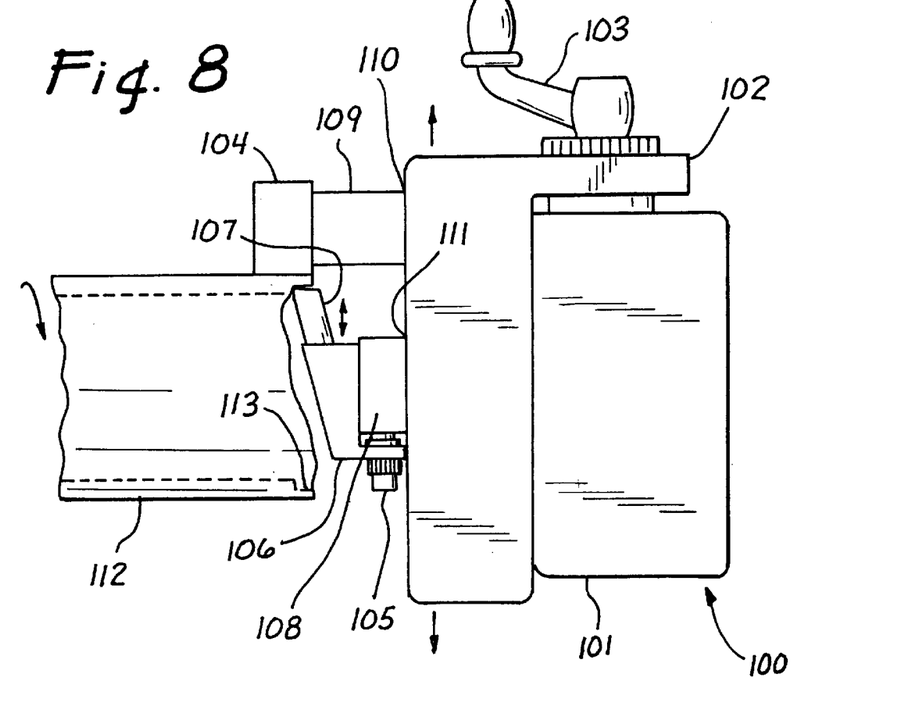
FIG. 8 is a side view of an alternative embodiment of apparatus for fabricating components of bearings in accordance with the invention.
Figure 8A:
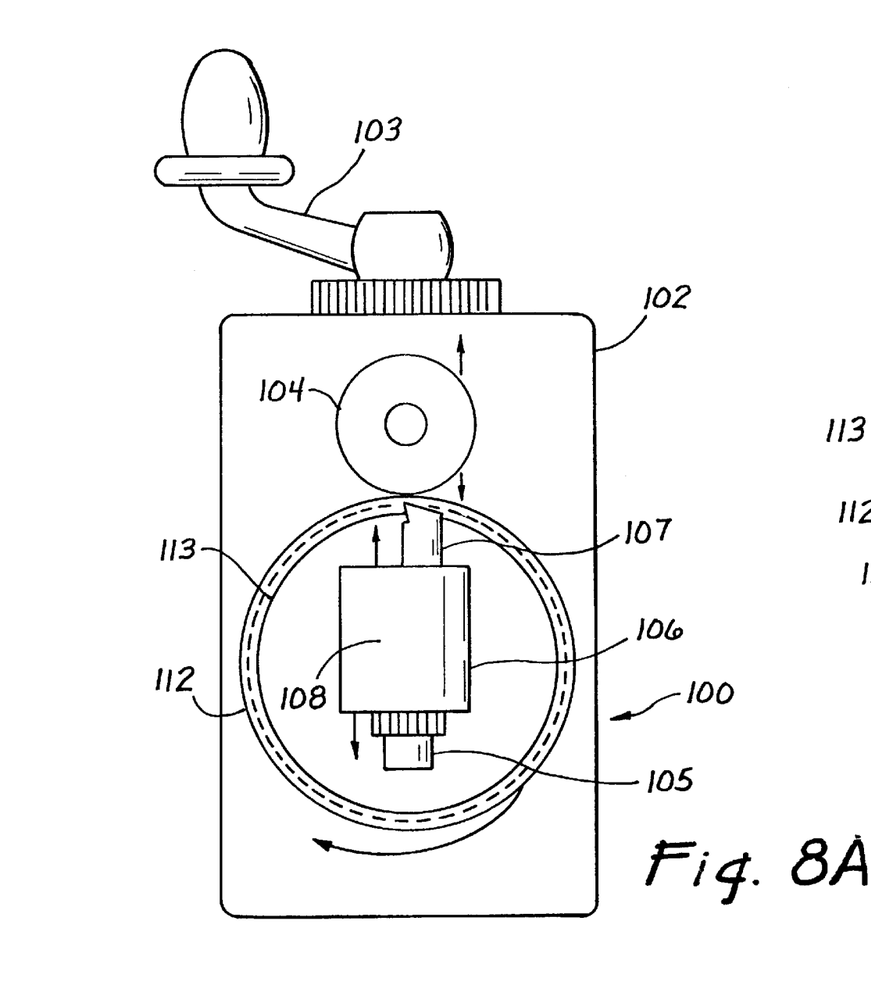
FIG. 8A is an end view of the apparatus of FIG. 8.

As depicted in FIG. 8 and FIG. 8A, apparatus 100 for use in connection with fabricating bearings in accordance with the invention, includes a tool mount 101 for mounting apparatus 100 upon a turret, carriage on a lathe or any type of automatic or manual machining center (not shown).

Apparatus 100 further includes a slide 102 connected to a crank 103 and a block or roller 104 connected thereto. Further included in apparatus 100 is a cutting tool adjustment 105 connected to a cutting tool holder 106 to which is coupled a cutting tool 107. A secondary adjustment slide 108 is connected to cutting tool 107 mounting cutting tool holder 106. A roller holding bar 109 mounts roller 104. Roller 104 and cutting tool holder 106 are positioned in a pair of receiving mounts 110, 111 respectively, defined on slide 102. Roller 104 and cutting tool holder 106 with cutting tool 107 may be separately mounted on the same types of machines (not shown) referred to above in connection with mounting apparatus 100.

In operation, a workpiece 112 comparable to member 52 defining a bore 113 is held on a revolving tool such as a rotating chuck (not shown). Apparatus 100 is adjustable in two dimensions vertically and horizontally. Slide 102 is movable vertically by turning crank 103, thereby moving roller 104 and cutter 107. Tool 107 is adjustable independently by rotation of adjustment 105, thereby controlling depth of cut. Apparatus 100 is moved horizontally by the machine (not shown) upon which it is mounted, regulating the width of the cut.

Roller 104 applies appropriate pressure to support member 112, and cutting tool 107 cuts material from member 112. Slide adjustment 108 and bar 109 are moveable for machining the exterior of tube 52. In accordance with the invention, cutting tool 107 and roller 104 are concurrently placed in their respective mounts and the chuck (not shown) is operated to turn the workpiece 112 whereby the cutter 107 and roller 104 coact to provide a machined workpiece with walls of substantially uniform thickness.

Figure 9:
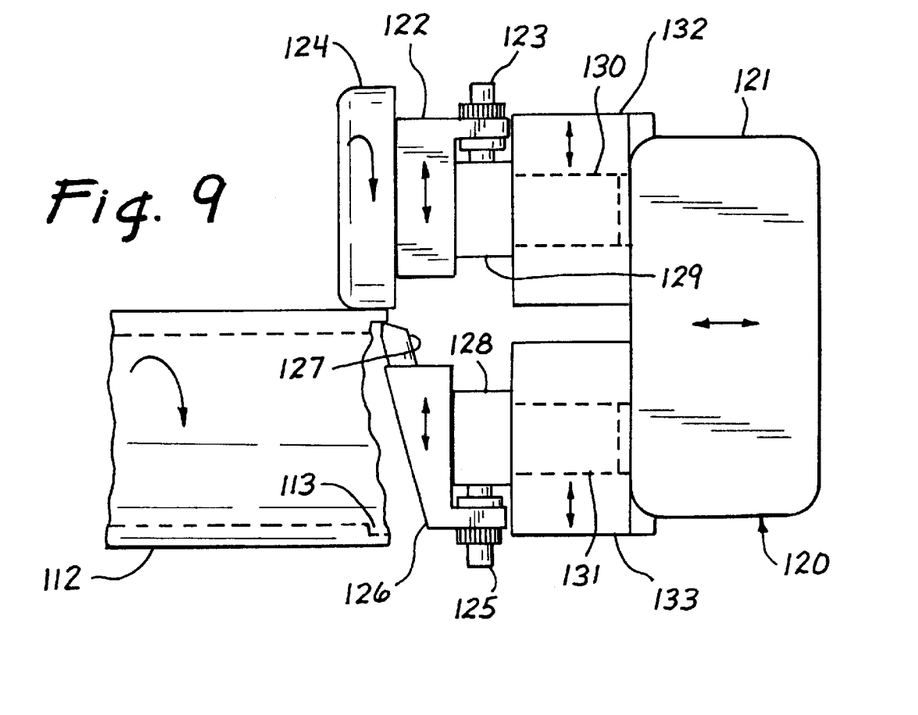
FIG. 9 is a side view of a preferred embodiment of an alternative embodiment of apparatus for fabricating components of bearings in accordance with the invention.
Figure 9A:
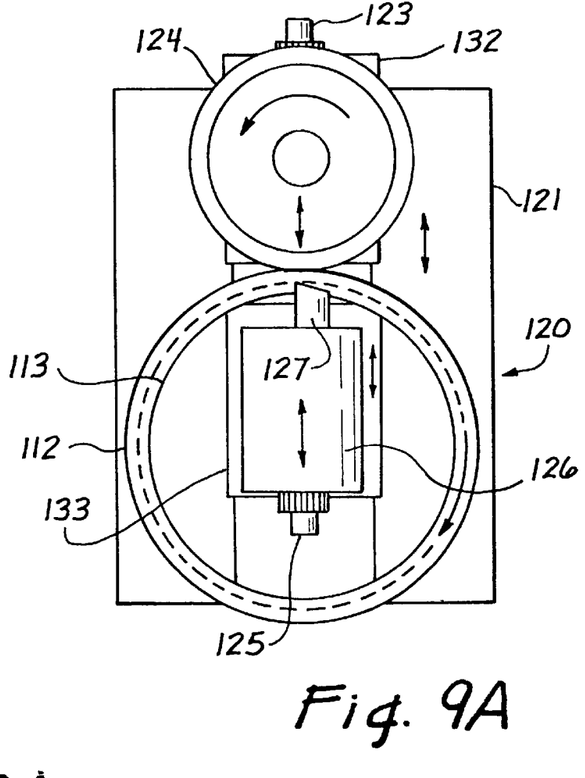
FIG. 9A is an end view of the apparatus of FIG. 9.

As depicted in FIG. 9 and FIG. 9A, apparatus 120 for use in connection with fabricating bearings in accordance with the invention includes a tool mount 121 for mounting apparatus 120 upon a turret or carriage (not shown).

Apparatus 120 further includes member 122 connected to roller adjustment member 123 and a roller 124 coupled thereto. Further included in apparatus 120 is a cutting tool adjustment member 125 connected to a cutting member 127 through a cutting tool holder 126 held in a cutting tool slide member 128. A slide member 129 mounts member 122 holding roller 124. Member 129 is positioned on a receiving mount 132 which in the particular application depicted defines a receiving bore 130; however, other means of mounting, such as bolting may be employed. Member 128 is positioned on a receiving mount 133 which in the particular application depicted, defines a receiving bore 131; as with mount 132, mount 133 may employ various means for mounting such as bolting. Adjustment member 125 regulates the depth of cut.

Roller 124 applies pressure to workpiece 112 while cutting member 127 cuts material from workpiece 112.

Cutting member 127 and roller 124 are independently adjustable vertically through adjustment members 123, 125 respectively such that the distance between them can be adjusted. When adjustment is complete a chuck (not shown) is operated to turn the workpiece 112, at which time cutter member 127 and roller 124 coact to provide a machined workpiece defining a bore and having walls of substantially uniform thickness. The width of cut is regulated by moving the apparatus horizontally with the machine (not shown) upon which it is mounted.

Figure 10:
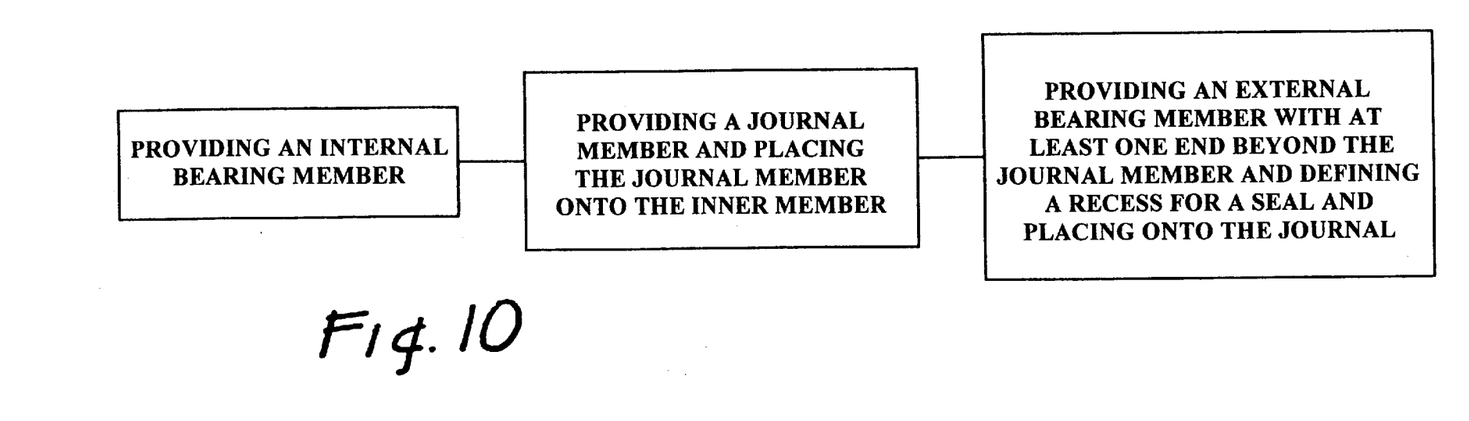
FIG. 10 is a schematic diagram of a method for fabricating improved bearings in accordance with the invention.

A method of fabricating an improved bearing is depicted in FIG. 10. The steps include providing an internal bearing member, affixing a journal member thereonto, and fitting onto the latter an external bearing member with space for a seal secured at its ends, at least one end of the outer bearing member extending beyond the end of the sleeve member. In particular applications, as when shafts are captive or so configured as to limit installation of metal or rigid seals, elastomer or split seals may be employed whereby the seal body may be stretched or parted and rejoined to a shaft to resume its normal size.

Figure 11:
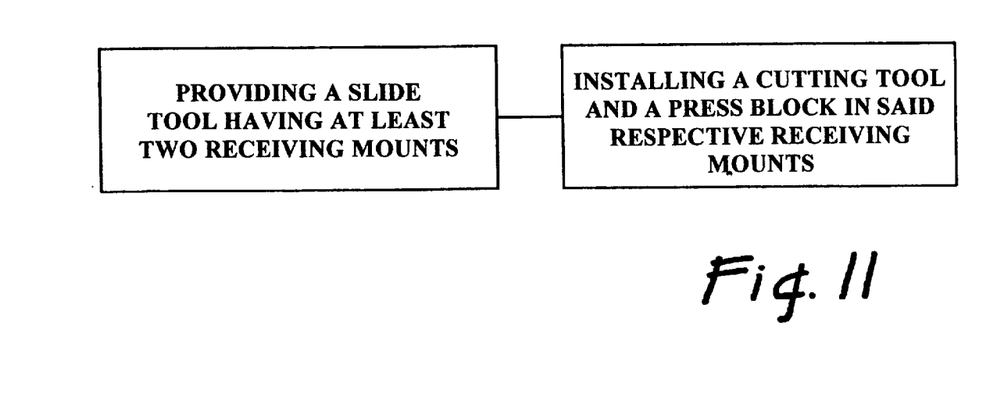
FIG. 11 is a schematic diagram of a method for fabricating components of bearings in accordance with the invention.

A method of fabricating an internal bearing member comprises the steps of providing a slide tool having at least two receiving mounts, installing a cutting tool and block or roller(s) concurrently to said receiving mounts, adjusting the distance between the cutting tool and the block, and rotating a workpiece constrained by said block such that said cutting tool cuts a bore therein with walls of the workpiece being of substantially uniform thickness.

In the foregoing manner, an improved bearing and method and apparatus for fabrication of same are provided. The within specification and drawings are illustrative, not limiting, the scope of the invention being defined by the appended claims construed in light of the specification and drawings.

What is claimed is:

1. An improved bearing comprising a unitary assembly including:
    (1) an internal member;
    (2) a journal member disposed upon said internal member; and
    (3) an external member disposed upon said journal member, at least one end of said external member extending beyond at least one end of said journal member, thereby forming a recess with said journal member for receiving at least one seal member for sealing between said external member and said internal member wherein said internal member and said journal member are pressfitted to each other and fitted to said external member.

2. An improved bearing comprising a unitary assembly including:
    (1) an internal member;
    (2) a journal member disposed upon said internal member; and
    (3) an external member disposed upon said journal member, at least one end of said external member extending beyond at least one end of said journal member, thereby forming a recess with said journal member for receiving at least one seal member for sealing between said external member and said internal member wherein said journal member and said internal member comprise a single integral member.

3. The invention as set forth in claim 2 wherein said external member defines a first groove and said single integral member defining a second groove mating with said first groove to comprise a receptacle for receiving a seal member.

4. An improved bearing comprising a unitary assembly including:
    (1) an internal member;
    (2) a journal member disposed upon said internal member; and (3) an external member disposed upon said journal member, at least one end of said external member extending beyond at least one end of said journal member, thereby forming a recess with said journal member for receiving at least one seal member for sealing between said external member and said internal member further including a seal member, said seal member including a body and a lip, said seal member being disposed within said recess of said external member such that said seal body seats in contact with said internal member and said seal lip contacts said external member.

5. An improved bearing comprising:

(1) an internal member;

(2) an external member disposed upon said internal member, said external member
and said internal member forming a seat for at least one seal member between said external member and said internal member for sealing between said external member and said internal member, at least a portion of one of said members extending beyond at least a portion of the other of said members thereby forming said seat, wherein a seal member is disposed in said seat, wherein said seal member includes a seal body and seal lip and wherein said seal body seats against said internal member and said seal lip contacts said external member.

* * * * *